(12) United States Patent
Martinez et al.

(10) Patent No.: US 10,641,059 B2
(45) Date of Patent: *May 5, 2020

(54) EXTENDED-LIFE SETTABLE COMPOSITIONS COMPRISING RED MUD

(71) Applicant: Halliburton Energy Services, Inc., Houston, TX (US)

(72) Inventors: Juan Humberto Martinez, Houston, TX (US); Thomas Jason Pisklak, Cypress, TX (US); Jiten Chatterji, Duncan, OK (US); Darrell Chad Brenneis, Marlow, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/288,413

(22) Filed: Feb. 28, 2019

(65) Prior Publication Data

US 2019/0195044 A1 Jun. 27, 2019

Related U.S. Application Data

(62) Division of application No. 15/540,554, filed as application No. PCT/US2015/013533 on Jan. 29, 2015, now Pat. No. 10,323,479.

(51) Int. Cl.
*E21B 33/14* (2006.01)
*C04B 28/18* (2006.01)
*C09K 8/467* (2006.01)
*C04B 24/00* (2006.01)
*C04B 103/22* (2006.01)

(52) U.S. Cl.
CPC ............ *E21B 33/14* (2013.01); *C04B 24/003* (2013.01); *C04B 28/18* (2013.01); *C09K 8/467* (2013.01); *C04B 2103/22* (2013.01)

(58) Field of Classification Search
CPC ... C04B 24/003; C04B 28/18; C04B 2103/22; C09K 8/467; E21B 33/14
See application file for complete search history.

(56) References Cited

U.S. PATENT DOCUMENTS

| | | | |
|---|---|---|---|
| 3,944,648 A * | 3/1976 | Solymar | C01F 7/0633 423/121 |
| 3,989,513 A * | 11/1976 | Dobos | C01F 7/066 75/10.67 |
| 5,058,679 A | 10/1991 | Hale et al. | |
| 5,322,389 A | 6/1994 | Smith | |
| 5,447,197 A | 9/1995 | Rae et al. | |
| 5,472,051 A | 12/1995 | Brothers | |
| 5,547,506 A | 8/1996 | Rae et al. | |
| 6,153,562 A | 11/2000 | Villar et al. | |
| 7,204,307 B2 | 4/2007 | Roddy et al. | |
| 7,204,310 B1 | 4/2007 | Roddy et al. | |
| 7,478,675 B2 | 1/2009 | Roddy et al. | |
| 7,674,332 B2 | 3/2010 | Roddy et al. | |
| 7,691,198 B2 * | 4/2010 | Van Deventer | B28C 7/0418 106/600 |
| 8,505,630 B2 | 8/2013 | Chatterji et al. | |
| 10,323,479 B2 * | 6/2019 | Martinez | C09K 8/467 |
| 2010/0000729 A1 | 1/2010 | Alberty | |
| 2011/0048697 A1 | 3/2011 | Lewis et al. | |
| 2011/0048711 A1 | 3/2011 | Lewis et al. | |
| 2014/0000893 A1 | 1/2014 | Lewis et al. | |
| 2014/0202698 A1 | 7/2014 | Pisklak et al. | |
| 2016/0137521 A1 | 5/2016 | Kumar et al. | |

FOREIGN PATENT DOCUMENTS

| | | |
|---|---|---|
| AU | 2014410209 | 3/2017 |
| WO | 1995019942 | 7/1995 |
| WO | 2000043317 | 7/2000 |
| WO | 2010116143 | 10/2010 |
| WO | 2016068874 | 5/2016 |

OTHER PUBLICATIONS

Liu et al.; "Utilization of Red Mud in Cement Production", A Review; Waste Management & Research; pp. 1053-1063 (2011).
ISRWO International Search Report and Written Opinion for PCT/US2015/013533 dated Sep. 30, 2015.
Final Office Action dated May 29, 2018 for U.S. Appl. No. 15/540,554.
Notice of Allowance dated Feb. 5, 2019 for U.S. Appl. No. 15/540,554.
Office Action dated Feb. 8, 2018 for U.S. Appl. No. 15/540,554.
Office Action dated Aug. 27, 2018 for U.S. Appl. No. 15/540,554.
Schlumberger Oilfield Glossary "Red Mud" dated 2018 retrieved from http://www.glossary.oilfield.slb.com/Terms/r/red_mud.aspx.
Examination Report dated Sep. 1, 2017 for Application No. 2015380590.
Ramy N. Eid et al., SPE 105500, "Liquid Cement: Changing the Paradigm", 2007.
Phil Rae, et al., IADC/SPE 35086, "Liquid Cement Premix Introduces New Solutions to Conventional Cementing Problems", 1996.

* cited by examiner

*Primary Examiner* — Anthony J Green
(74) *Attorney, Agent, or Firm* — Thomas Rooney; C. Tumey Law Group PLLC

(57) ABSTRACT

A method for using an extended-life settable composition is disclosed. The method includes providing an extended-life settable composition comprising red mud, calcium hydroxide, water, and a cement set retarder. The method further includes activating the extended-life settable composition. The method additionally includes introducing the extended-life settable composition into a subterranean formation and allowing the extended-life settable composition to set in the subterranean formation.

9 Claims, 3 Drawing Sheets

US 10,641,059 B2

EXTENDED-LIFE SETTABLE COMPOSITIONS COMPRISING RED MUD

CROSS-REFERENCE TO RELATED APPLICATIONS

This application is a divisional of application Ser. No. 15/540,554, filed 28 Jun. 2017, now U.S. Pat. No. 10,323,479 which is a 371 of PCT/US2015/013533, filed 29 Jan. 2015, the disclosures of which are incorporated herein in their entirety.

BACKGROUND

Extended-life settable compositions are provided and, more particularly, extended-life settable compositions are provided that comprise red mud and water.

Settable compositions may be used in a variety of subterranean operations. For example, in subterranean well construction, a pipe string (e.g., casing, liners, expandable tubulars, etc.) may be run into a wellbore and cemented in place. The process of cementing the pipe string in place is commonly referred to as "primary cementing." In a typical primary cementing method, a settable composition may be pumped into an annulus between the walls of the wellbore and the exterior surface of the pipe string disposed therein. The settable composition may set in the annular space, thereby forming a hardened, substantially impermeable annular sheath that may support and position the pipe string in the wellbore and may bond the exterior surface of the pipe string to the subterranean formation. Among other things, the annular sheath surrounding the pipe string prevents the migration of fluids in the annulus and protects the pipe string from corrosion. Settable compositions may also be used in remedial cementing methods to seal cracks or holes in pipe strings or annular sheaths, to seal highly permeable formation zones or fractures, or to place a cement plug and the like.

A broad variety of settable compositions have been used in subterranean cementing operations. In some instances, extended-life settable compositions have been used. In contrast to conventional settable compositions that set and harden upon preparation, extended-life settable compositions are characterized by being capable of remaining in a pumpable fluid state for at least about one day (e.g., about 7 days, about 2 weeks, about 2 years or more) at room temperature (e.g., about 80° F.) in storage. When desired for use, the extended-life settable compositions should be capable of activation and consequently develop reasonable compressive strengths. For example, an extended-life settable composition that is activated may set into a hardened mass. Among other things, extended-life settable compositions may be suitable for use in wellbore applications such as applications where it is desirable to prepare the settable composition in advance. This may allow the settable composition to be stored prior to use. In addition, this may allow the settable composition to be prepared at a convenient location before transportation to the job site. Accordingly, capital expenditures may be reduced due to a reduction in the need for on-site bulk storage and mixing equipment. This may be particularly useful for offshore cementing operations where space onboard the vessels may be limited.

While extended-life cement compositions have been developed heretofore, challenges exist with their successful use in subterranean cementing operations. For example, some extended-life settable compositions may have limited use at lower temperatures as they may not develop sufficient compressive strength when used in subterranean formations having lower bottom hole static temperatures. In addition, it may be problematic to activate some extended-life settable compositions while maintaining acceptable thickening times and compressive strength development. Moreover, supply/inventory constraints may restrict the availability of certain key components of extended-life settable compositions depending on geographic availability.

BRIEF DESCRIPTION OF THE DRAWINGS

These drawings illustrate certain aspects of some of the embodiments of the present method, and should not be used to limit or define the method.

DETAILED DESCRIPTION

Figure 1:
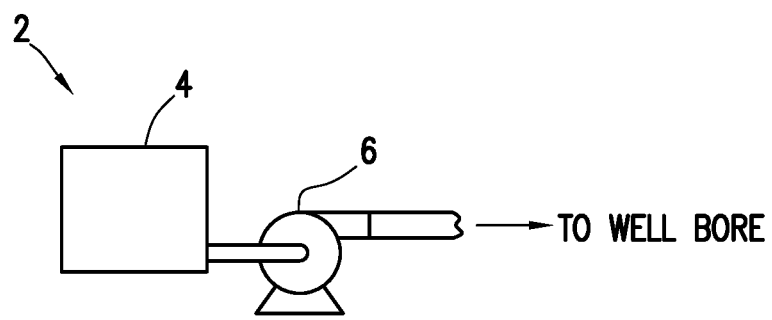
FIG. 1 illustrates a system for preparation and delivery of an extended-life settable composition to a wellbore in accordance with certain embodiments.

Extended-life settable compositions are provided and, more particularly, extended-life settable compositions are provided that comprise red mud and water. The extended-life settable compositions may have desirable rheological properties allowing them to be stored on the surface for an extended period of time and subsequently activated prior to pumping downhole. One of the many potential advantages to these compositions is that an effective use for red mud may be provided thus minimizing the amount of the waste being deposited in disposal sites, such as containment reservoirs. Another potential advantage of these methods and compositions is that the cost of subterranean operations may be reduced by replacement of higher cost additives (e.g., Portland cement, pumice, etc.) with the red mud. Yet another potential advantage of these compositions is that the extended-life settable compositions when activated may provide a settable composition with sufficient strength for use in wellbore applications, such as primary and remedial cementing, among others. Yet another potential advantage is that red mud may be readily available in certain geographic locations where other the inventory/availability of other components of extended-life settable compositions may be limited.

The settable component included in the extended-life settable compositions may comprise red mud. The red mud may be obtained from the refining of bauxite ore using the Bayer process in which bauxite ore is digested by sodium hydroxide followed by filtration of the solid impurities. The mixture of solid impurities is known as "red mud," and it is removed from the other products of the Bayer process. Red mud may also be known as "bauxite refinery residue." As used herein, the term "red mud" refers to a waste/by-product produced when bauxite is refined using the Bayer process to produce alumina. A typical alumina plant may produce one to two times as much red mud as alumina. Red mud has typically been considered an undesirable by-product that can add costs to the production of alumina as well as environmental concerns associated with its disposal. Currently, red mud is typically held in disposal sites such as landfills, retention ponds, or left exposed in piles on the surface. The term "red mud," as used herein, is also intended to encompass red mud solids that have been processed or stabilized in some manner, such as by drying, for example.

The red mud may be provided in any suitable form, including as dry solids or in a liquid form, which may comprise red mud solids and an aqueous based fluid. The settable component comprises the red mud. The aqueous based fluid content of the red mud may be as high as 25% by weight of the red mud or potentially even higher. If desired, the red mud may be dried to reduce its water content prior to use. Natural or mechanical means may be used for drying the red mud. By way of example, the red mud may be air dried or drum dried.

While the chemical analysis of red mud will typically vary from various manufacturers depending on a number of factors, including the particular solid material feed, process conditions, treatments, and the like, red mud typically may comprise a mixture of solid and metallic oxide-bearing minerals. By way of example, the red mud may comprise a number of different oxides (based on oxide analysis), including, without limitation, $Na_2O$, $MgO$, $Al_2O_3$, $SiO_2$, $CaO$, and/or $Fe_2O_3$. Moreover, the red mud generally may comprise a number of different crystal structures, including, without limitation, calcite ($CaCO_3$), quartz ($SiO_2$), hematite ($Fe_2O_3$), hauyne ($Na_3CaAl_3Si_3O_{12}(SO_4)_2$), kaolinite ($Al_2Si_2O_5(OH)_4$), etc. The majority of red mud may be calcite and quartz with lesser amounts of hematite, kaolinite, hauyne, etc. The composition of red mud is discussed further in Example 1 below.

The red mud may serve as a low cost cement substitute in extended-life settable compositions. Red mud may have pozzolanic activity such that the red-mud may react with calcium hydroxide in the presence of water. As will be appreciated, calcium hydroxide may be provided in the extended-life settable compositions.

The red mud may be included in the extended-life settable compositions in a crushed, ground, powder, or other suitable particulate form. The red mud may comprise particles with a particle size in a range of less than 1 µm to over 1000 µm. The median particle size of red mud may be between 1 µm and 200 µm. For example, a d50 particle size distribution of from about 1 µm to about 200 µm and, alternatively, from about 10 µm to about 50 µm. By way of further example, the red mud may have a d50 particle size distribution ranging between any of and/or including any of about 1 µm, about 5 µm, about 10 µm, about 20 µm, about 30 µm, about 40 µm, about 50 µm, about 60 µm, about 70 µm, about 80 µm, about 90 µm, about 100 µm, about 150 µm, or about 200 µm. Further the red mud may comprise particles with particle diameters less than 3 µm. In some examples, the red mud may have a multi-modal particle size distribution. By way of example, the red mud may have 2, 3, 4, 5, 6, or more modal peaks. Modal peaks occur on a particle size distribution curve when there are increased particle concentrations relative to particle sizes on either side of the curve. The particles size distribution of red mud is discussed in more detail below in Example 2. One of ordinary skill in the art, with the benefit of this disclosure, should be able to select an appropriate particle size for the red mud for a particular application.

The red mud may be included in the extended-life settable compositions in an amount suitable for a particular application. For example, the red mud may be included in the extended-life settable compositions in an amount in the range of from about 50% to about 90% by weight of the extended-life settable composition. By way of further example, the red mud may be present in an amount ranging between any of and/or including any of about 50%, about 55%, about 65%, about 70%, about 75%, about 80%, about 85%, or about 90% by weight of the extended-life settable composition. In a particular example, the red mud may be present in an amount of about 50% to about 80% by weight of the extended-life settable component. One of ordinary skill in the art, with the benefit of this disclosure, should recognize the appropriate amount of the red mud to include for a chosen application.

Calcium hydroxide, also known as "hydrated lime," may be present in the extended-life settable compositions. In some embodiments, the calcium hydroxide may be provided as quicklime (calcium oxide) which hydrates when mixed with water to form the calcium hydroxide. The calcium hydroxide may be included in embodiments of the set-delayed cement compositions, for example, to form a hydraulic composition with the red mud. For example, the calcium hydroxide may be included in a red mud-to-calcium hydroxide weight ratio of about 10:1 to about 1:1 or 3:1 to about 5:1. Where present, the calcium hydroxide may be included in the extended-life settable compositions in an amount in the range of from about 10% to about 100% by weight of the red mud. The calcium hydroxide may be present in an amount ranging between any of and/or including any of about 10%, about 20%, about 40%, about 60%, about 80%, or about 100% by weight of the red mud. One of ordinary skill in the art, with the benefit of this disclosure, will recognize the appropriate amount of calcium hydroxide to include for a chosen application.

The extended-life settable composition may not further comprise a hydraulic cement or other cementitious component. In other words, the extended life settable composition may be free of any additional cementitious components other than the red mud. These varieties of hydraulic cements may include cements comprising calcium, aluminum, silicon, oxygen, iron, and/or sulfur, which set and harden by reaction with water. Specific examples may include, but are not limited to, Portland cements, pozzolana cements, gypsum cements, high alumina content cements, silica cements, and any combination thereof. The cementitious components present in the extended-life settable compositions may consist essentially of the red mud. For example, the cementitious components may comprise the red mud without any additional components (e.g., Portland cement, fly ash, slag cement) that hydraulically set in the presence of water.

The extended-life settable composition may further comprise a cement set retarder. A broad variety of cement set retarders may be suitable for use. For example, the cement set retarder may comprise phosphonic acids, such as ethylenediamine tetra(methylene phosphonic acid), diethylenetriamine penta(methylene phosphonic acid), etc.; lignosulfonates, such as sodium lignosulfonate, calcium lignosulfonate, etc.; salts such as stannous sulfate, lead acetate, monobasic calcium phosphate, organic acids, such as citric acid, tartaric acid, etc.; cellulose derivatives such as hydroxyl ethyl cellulose (HEC) and carboxymethyl hydroxyethyl cellulose (CMHEC); synthetic co- or terpolymers comprising sulfonate and carboxylic acid groups such as sulfonate-functionalized acrylamide-acrylic acid copolymers; borate compounds such as alkali borates, sodium metaborate, sodium tetraborate, potassium pentaborate; derivatives thereof, or mixtures thereof. Examples of suitable cement set retarders include, among others, phosphonic acid derivatives. One example of a suitable cement set retarder is Micro Matrix® cement retarder, available from Halliburton Energy Services, Inc., Houston, Tex. Generally, the cement set retarder may be present in the extended-life settable composition in an amount sufficient to delay setting for a desired time. The cement set retarder may be present in the extended-life settable composition in an amount in the range of from about 0.01% to about 10% by weight of the red mud. More particularly, the cement set retarder may be present in an amount ranging between any of and/or including any of about 0.01%, about 0.1%, about 1%, about 2%, about 4%, about 6%, about 8%, or about 10% by weight of the red mud. One of ordinary skill in the art, with the benefit of this disclosure, should recognize the appropriate amount of the cement set retarder to include for a chosen application.

The extended-life settable compositions may optionally comprise a dispersant. Examples of suitable dispersants may include, without limitation, sulfonated-formaldehyde-based dispersants (e.g., sulfonated acetone formaldehyde condensate), examples of which may include Daxad® 19 dispersant available from Geo Specialty Chemicals, Ambler, Pa. Other suitable dispersants may be polycarboxylated ether dispersants such as Liquiment® 5581F and Liquiment® 514L dispersants available from BASF Corporation Houston, Tex.; or Ethacryl™ G dispersant available from Coatex, Genay, France. An additional example of a suitable commercially available dispersant is CFR™-3 dispersant, available from Halliburton Energy Services, Inc., Houston, Tex. The Liquiment® 514L dispersant may comprise 36% by weight of the polycarboxylated ether in water. While a variety of dispersants may be used, some dispersants may be preferred for use with certain cement set retarders. For example, if an extended-life settable composition comprises a phosphonic acid derivative cement set retarder, a polycarboxylated ether dispersant may be preferable. Without being limited by theory, it is believed that polycarboxylated ether dispersants may synergistically interact with phosphonic acid derivative cement set retarders resulting in formation of a gel that suspends the red mud in the composition for an extended period of time. One of ordinary skill in the art, with the benefit of this disclosure, should recognize the appropriate type of dispersant to include for a chosen application.

The dispersant may be included in the extended-life settable compositions in an amount in the range of from about 0.01% to about 5% by weight of the red mud. More particularly, the dispersant may be present in an amount ranging between any of and/or including any of about 0.01%, about 0.1%, about 0.5%, about 1%, about 2%, about 3%, about 4%, or about 5% by weight of the red mud. One of ordinary skill in the art, with the benefit of this disclosure, will recognize the appropriate amount of dispersant to include for a chosen application.

The extended-life cement compositions may comprise water. The water may be from any source provided that it does not contain an excess of compounds that may undesirably affect other components in the extended-life settable compositions. The water may comprise fresh water or salt water. Salt water generally may include one or more dissolved salts therein and may be saturated or unsaturated as desired for a particular application. Seawater or brines may be suitable for use in some applications. Further, the water may be present in an amount sufficient to form a pumpable slurry. In certain embodiments, the water may be present in the extended-life settable compositions in an amount in the range of from about 33% to about 200% by weight of the red mud. In certain embodiments, the water may be present in the extended-life settable compositions in an amount in the range of from about 35% to about 70% by weight of the red mud. With the benefit of this disclosure one of ordinary skill in the art should recognize the appropriate amount of water for a chosen application.

Other optional additives suitable for use in subterranean cementing operations may also be added to the extended-life settable compositions as deemed appropriate by one of ordinary skill in the art. As desired, these additives may be added prior to, or after, storage of the extended-life settable compositions. Examples of such additives include, but are not limited to, strength-retrogression additives, set weighting agents, lightweight additives, gas-generating additives, mechanical property enhancing additives, lost-circulation materials, defoaming agents, foaming agents, thixotropic additives, and combinations thereof. Specific examples of these, and other, additives include silica (e.g., crystalline silica, amorphous silica, fumed silica, etc.), salts, fibers, hydratable clays, shale (e.g., calcined shale, vitrified shale, etc.), microspheres, diatomaceous earth, natural pozzolan, resins, latex, combinations thereof, and the like. Other optional additives may also be included, including, but not limited to, cement kiln dust, lime kiln dust, fly ash, slag cement, shale, zeolite, metakaolin, pumice, perlite, lime, silica, rice husk ash, small-particle size cement, combinations thereof, and the like. A person having ordinary skill in the art, with the benefit of this disclosure, will be able to determine the type and amount of additive useful for a particular application and desired result.

Optionally, strength-retrogression additives may be included in extended-life settable compositions to, for example, prevent the retrogression of strength after the extended-life settable composition has been allowed to develop compressive strength. These additives may allow the extended-life settable compositions to form as intended, preventing cracks and premature failure of the extended-life settable composition. Examples of suitable strength-retrogression additives may include, but are not limited to, amorphous silica, coarse grain crystalline silica, fine grain crystalline silica, or a combination thereof.

Optionally, weighting agents may be included in the extended-life settable compositions. Weighting agents are typically materials that weigh more than water and may be used to increase the density of the extended-life settable compositions. By way of example, weighting agents may have a specific gravity of about 2 or higher (e.g., about 2, about 4, etc.). Examples of weighting agents that may be used include, but are not limited to, hematite, hausmannite, and barite, and combinations thereof. Specific examples of suitable weighting agents include HI-DENSE® weighting agent, available from Halliburton Energy Services, Inc.

Optionally, lightweight additives may be included in the extended-life settable compositions to, for example, decrease the density of the extended-life settable compositions. Examples of suitable lightweight additives include, but are not limited to, bentonite, coal, diatomaceous earth, expanded perlite, fly ash, gilsonite, hollow microspheres, low-density elastic beads, nitrogen, pozzolan-bentonite, sodium silicate, combinations thereof, or other lightweight additives known in the art.

Optionally, gas-generating additives may be included in the extended-life settable compositions to release gas at a predetermined time, which may be beneficial to prevent gas migration from the formation through the extended-life settable composition before it hardens. The generated gas may combine with or inhibit the permeation of the extended-life settable composition by formation gas. Examples of suitable gas-generating additives include, but are not limited to, metal particles (e.g., aluminum powder) that react with an alkaline solution to generate a gas.

Optionally, mechanical-property-enhancing additives may be included in the extended-life settable compositions to, for example, ensure adequate compressive strength and long-term structural integrity. These properties can be affected by the strains, stresses, temperature, pressure, and impact effects from a subterranean environment. Examples of mechanical property enhancing additives include, but are not limited to, carbon fibers, glass fibers, metal fibers, mineral fibers, silica fibers, polymeric elastomers, and latexes.

Optionally, lost-circulation materials may be included in embodiments of the extended-life settable compositions to, for example, help prevent the loss of fluid circulation into the subterranean formation. Examples of lost-circulation materials include but are not limited to, cedar bark, shredded cane stalks, mineral fiber, mica flakes, cellophane, calcium carbonate, ground rubber, polymeric materials, pieces of plastic, grounded marble, wood, nut hulls, plastic laminates (Formica® laminate), corncobs, and cotton hulls.

Optionally, defoaming additives may be included in the extended-life settable compositions to, for example, reduce tendency for the extended-life settable slurries to foam during mixing and pumping of the extended-life settable slurries. Examples of suitable defoaming additives include, but are not limited to, polyol silicone compounds. Suitable defoaming additives are available from Halliburton Energy Services, Inc., under the product name D-AIR™ defoamers.

Optionally, foaming additives (e.g., foaming surfactants) may be included to, for example, facilitate foaming and/or stabilize the resultant foam formed therewith. Examples of suitable foaming additives include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. An example of a suitable foaming additive is ZONESEALANT™ 2000 agent, available from Halliburton Energy Services, Houston, Tex.

Optionally, thixotropic additives may be included in the extended-life settable compositions to, for example, provide an extended-life settable composition that may be pumpable as a thin or low viscosity fluid, and when allowed to remain quiescent attains a relatively high viscosity. Among other things, thixotropic additives may be used to help control free water, create rapid gelation as the slurry sets, combat lost circulation, prevent "fallback" in annular column, and minimize gas migration. Examples of suitable thixotropic additives include, but are not limited to, gypsum, water soluble carboxyalkyl, hydroxyalkyl, mixed carboxyalkyl hydroxyalkyl either of cellulose, polyvalent metal salts, zirconium oxychloride with hydroxyethyl cellulose, or a combination thereof.

Those of ordinary skill in the art will appreciate that embodiments of the extended-life settable compositions generally should have a density suitable for a particular application. By way of example, the extended-life settable compositions may have a density in the range of from about 4 pounds per gallon ("ppg") to about 20 ppg. In certain embodiments, the extended-life settable compositions may have a density in the range of from about 8 ppg to about 17 ppg. Embodiments of the extended-life settable compositions may be foamed or unfoamed or may comprise other means to reduce their densities, such as hollow microspheres, low-density elastic beads, or other density-reducing additives known in the art. In embodiments, the density may be reduced after storage, but prior to placement in a subterranean formation. In embodiments, weighting additives may be used to increase the density of the extended-life settable compositions. Examples of suitable weighting additives may include barite, hematite, hausmannite, calcium carbonate, siderite, ilmenite, or combinations thereof. In particular embodiments, the weighting additives may have a specific gravity of 3 or greater. Those of ordinary skill in the art, with the benefit of this disclosure, should recognize the appropriate density for a particular application.

The extended-life settable compositions may have a delayed set in that they may be capable of remaining in a pumpable fluid state for at least one day (e.g., about 1 day, about 2 weeks, about 2 years or more) at room temperature (e.g., about 80° F.) in storage. For example, the extended-life settable compositions may remain in a pumpable fluid state for a period of time from about 1 day to about 7 days or more. In some embodiments, the extended-life settable compositions may remain in a pumpable fluid state for at least about 1 day, about 7 days, about 10 days, about 20 days, about 30 days, about 40 days, about 50 days, about 60 days, or longer. A fluid is considered to be in a pumpable fluid state where the fluid has a consistency of less than 70 Bearden units of consistency ("Bc"), as measured on a pressurized consistometer in accordance with the procedure for determining cement thickening times set forth in API RP Practice 10B-2, *Recommended Practice for Testing Well Cements*, First Edition, July 2005.

Cement set activators may be added to the extended-life settable compositions. Cement set activators may induce and/or accelerate setting and may also activate retarded extended-life settable compositions. The term "activate," as used herein, refers to the activation of a retarded extended-life settable composition and in certain cases may also refer to the acceleration of the setting of an extended-life settable composition if the mechanism of said activation also accelerates the development of compressive strength. By way of example, a cement set activator may be added to an extended-life settable composition to activate an extended-life settable composition that has been retarded with a phosphonic acid. Alternatively, an extended-life settable composition may be thermally activated, for example, by exposure to elevated temperatures in a well bore. An extended-life settable composition that has been activated may set to form a hardened mass in a time period in the range of from about 1 hour to about 12 days. For example, embodiments of the extended-life settable compositions may set to form a hardened mass in a time period ranging between any of and/or including any of about 1 hour, about 6 hours, about 12 hours, about 1 day, about 2 days, about 4 days, about 6 days, about 8 days, about 10 days, or about 12 days.

Examples of suitable cement set activators include, but are not limited to: amines such as triethanolamine, diethanolamine; silicates such as sodium silicate; zinc formate; calcium acetate; Groups IA and IIA hydroxides such as sodium hydroxide, magnesium hydroxide, and calcium hydroxide; monovalent salts such as sodium chloride; divalent salts such as calcium chloride; nanosilica (i.e., silica having a particle size of less than or equal to about 100 nanometers); polyphosphates; and combinations thereof. The cement set activator should be added to embodiments of the extended-life settable compositions in amounts sufficient to induce the extended-life settable compositions to set into a hardened mass. In certain embodiments, the cement set activator may be added to an extended-life settable composition in an amount in the range of about 1% to about 20% by weight of the red mud. In specific embodiments, the cement set activator may be present in an amount ranging between any of and/or including any of about 1%, about 5%, about 10%, about 15%, or about 20% by weight of the red mud. One of ordinary skill in the art, with the benefit of this disclosure, will recognize the appropriate amount of cement set activator to include for a chosen application.

The extended-life settable compositions may set to have a desirable compressive strength after activation. Compressive strength is generally the capacity of a material or structure to withstand axially directed pushing forces. The compressive strength may be measured at a specified time after the activation of the extended-life settable compositions while the extended-life settable composition is maintained under specified temperature and pressure conditions. Compressive strength can be measured by either destructive or non-destructive methods. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods may employ a UCA™ Ultrasonic Cement Analyzer, available from Fann Instrument Company, Houston, Tex. Compressive strength values may be determined in accordance with API RP 10B-2, *Recommended Practice for Testing Well Cements*, First Edition, July 2005.

By way of example, extended-life settable compositions may develop a 24-hour compressive strength in the range of from about 50 psi to about 500 psi, alternatively, from about 100 psi to about 400 psi, or alternatively from about 200 psi to about 300 psi. In particular, the extended-life settable compositions may develop a compressive strength in 24 hours of at least about 50 psi, at least about 100 psi, at least about 200 psi, or more. The compressive strength values may be determined using destructive or non-destructive methods at any temperature.

In some examples, the extended-life settable compositions may have desirable thickening times. Thickening time typically refers to the time a fluid, such as an extended-life settable composition, remains in a fluid state capable of being pumped. A number of different laboratory techniques may be used to measure thickening time. A pressurized consistometer, operated in accordance with the procedure set forth in the aforementioned API RP Practice 10B-2, may be used to measure whether a fluid is in a pumpable fluid state. The thickening time may be the time for the treatment fluid to reach 70 Bc and may be reported as the time to reach 70 Bc. The extended-life settable compositions may have thickening times greater than about 1 hour, alternatively, greater than about 2 hours, greater than about 15 hours, greater than about 30 hours, greater than about 100 hours, or alternatively greater than about 190 hours at 3,000 psi and temperatures in a range of from about 50° F. to about 400° F., alternatively, in a range of from about 70° F. to about 140° F., and alternatively at a temperature of about 100° F.

As will be appreciated by those of ordinary skill in the art, the extended-life settable compositions may be used in a variety of subterranean operations, including primary and remedial cementing. For example, an extended-life settable composition may be provided that comprises red mud, calcium hydroxide, water, a cement set retarder, and optionally a dispersant. A cement set activator may be added to the extended-life settable composition to activate the extended-life settable composition prior to being pumped downhole where it may be introduced into a subterranean formation and allowed to set therein. As used herein, introducing the extended-life settable composition into a subterranean formation includes introduction into any portion of the subterranean formation, including, without limitation, into a wellbore drilled into the subterranean formation, into a near wellbore region surrounding the wellbore, or into both.

Additional applications may include storing extended-life settable compositions. For example, an extended-life settable composition may be provided that comprises red mud, calcium hydroxide, water, a cement set retarder, and optionally a dispersant. The extended-life settable composition may be stored in a vessel or other suitable container. The extended-life settable composition may be stored and then activated prior to or while pumping downhole. The extended-life settable composition may be permitted to remain in storage for a desired time period. For example, the extended-life settable compositions may remain in storage for a time period of about 1 day, about 2 weeks, about 2 years, or longer. For example, the extended-life settable composition may remain in storage for a time period of about 1 day, about 2 days, about 5 days, about 7 days, about 10 days, about 20 days, about 30 days, about 40 days, about 50 days, about 60 days, or up to about 2 years. When desired for use, the extended-life settable composition may be activated by addition of a cement set activator, introduced into a subterranean formation, and allowed to set therein.

In primary cementing applications, for example, an extended-life settable composition may be introduced into an annular space between a conduit located in a wellbore and the walls of a wellbore (and/or a larger conduit in the wellbore), wherein the wellbore penetrates the subterranean formation. The extended-life settable composition may be allowed to set in the annular space to form a hardened annular sheath. The extended-life settable composition may form a barrier that prevents the migration of fluids in the wellbore. The extended-life settable composition may also, for example, support the conduit in the wellbore.

In remedial cementing applications, the extended-life settable compositions may be used, for example, in squeeze-cementing operations or in the placement of plugs. By way of example, the extended-life settable compositions may be placed in a wellbore to plug an opening (e.g., a void or crack) in the formation, in a gravel pack, in the conduit, in the annular sheath, and/or between the annular sheath and the conduit (e.g., a microannulus).

A method may be provided. The method may be used in conjunction with one or more of the methods, compositions, and/or systems illustrated in FIGS. 1-3. The method may comprise providing an extended-life settable composition comprising red mud, calcium hydroxide, water, and a cement set retarder; activating the extended-life settable composition; introducing the extended-life settable composition into a subterranean formation; and allowing the extended-life settable composition to set in the subterranean formation. The red mud may be an insoluble residue from extraction of alumina from bauxite ore. The water may be present in the extended-life settable composition in an amount of at least 40% by weight of the red mud, and the calcium hydroxide may be present in the extended-life settable composition in an amount of at least 10% by weight of the red mud. The red mud may be provided from source of red mud having a water content up to 25% by weight of the red mud. The red mud may comprise at least 20% calcite. The cement set retarder may be selected from the group consisting of a phosphonic acid, a phosphonic acid derivative, a lignosulfonate, a salt, an organic acid, a cellulose derivative, a synthetic co- or ter-polymer comprising sulfonate and carboxylic acid groups, a borate compound, and any combination thereof. The extended-life settable composition may further comprise a dispersant. The cement set retarder may comprise a phosphonic acid derivative. The extended-life settable composition may comprise a polycarboxylated ether dispersant. The extended-life settable composition may be stored for a period of about 1 day or longer prior to the step of introducing the cement composition into the subterranean formation. The step of activating the extended-life settable composition may comprise adding a cement set activator to the extended-life settable composition. The step of introducing the extended-life settable composition may comprise pumping the extended-life settable composition through a feed pipe and into a wellbore annulus.

An extended-life settable composition may be provided. The settable composition may be used in conjunction with one or more of the methods, compositions, and/or systems illustrated in FIGS. 1-3. The settable composition may comprise red mud; calcium hydroxide; water; and a cement set retarder, wherein the extended-life settable composition is capable of remaining in a pumpable fluid state for about 1 day or longer at 80° F. The red mud may be an insoluble residue from extraction of alumina from bauxite ore. The water may be present in the extended-life settable composition in an amount of at least 40% by weight of the red mud, and the calcium hydroxide may be present in the extended-life settable composition in an amount of at least 10% by weight of the red mud. The red mud may be provided from source of red mud having a water content up to 25% by weight of the red mud. The red mud may comprise at least 20% calcite. The cement set retarder may be selected from the group consisting of a phosphonic acid, a phosphonic acid derivative, a lignosulfonate, a salt, an organic acid, a cellulose derivative, a synthetic co- or ter-polymer comprising sulfonate and carboxylic acid groups, a borate compound, and any combination thereof. The extended-life settable composition may further comprise a dispersant. The cement set retarder may comprise a phosphonic acid derivative. The extended-life settable composition may comprise a polycarboxylated ether dispersant.

A system may be provided. The system may be used in conjunction with one or more of the methods, compositions, and/or systems illustrated on FIGS. 1-3. The system may comprise an extended-life settable composition that is capable of remaining in a pumpable fluid state for about 1 day or longer at 80° F.; wherein the extended-life settable composition comprises red mud, calcium hydroxide, water, and a cement set retarder; and a cement set activator for activating and/or accelerating the extended-life settable composition. The system may further comprise a vessel containing the extended-life settable composition and a pump coupled to the vessel for delivering the extended-life settable composition into a wellbore. The red mud may be an insoluble residue from extraction of alumina from bauxite ore. The water may be present in the extended-life settable composition in an amount of at least 40% by weight of the red mud, and the calcium hydroxide may be present in the extended-life settable composition in an amount of at least 10% by weight of the red mud. The red mud may be provided from source of red mud having a water content up to 25% by weight of the red mud. The red mud may comprise at least 20% calcite. The cement set retarder may be selected from the group consisting of a phosphonic acid, a phosphonic acid derivative, a lignosulfonate, a salt, an organic acid, a cellulose derivative, a synthetic co- or ter-polymer comprising sulfonate and carboxylic acid groups, a borate compound, and any combination thereof. The extended-life settable composition may further comprise a dispersant. The cement set retarder may comprise a phosphonic acid derivative. The extended-life settable composition may comprise a polycarboxylated ether dispersant.

Referring now to FIG. 1, preparation of an extended-life settable composition will now be described. FIG. 1 illustrates a system 2 for the preparation of an extended-life settable composition and subsequent delivery of the composition to a wellbore. As shown, the extended-life settable composition may be stored in a vessel 4 and then pumped via pumping equipment 6 to the wellbore. The vessel 4 and the pumping equipment 6 may be disposed on one or more cement trucks as will be apparent to those of ordinary skill in the art. A cement set activator may be added to the extended-life settable composition in the vessel 4 or may be added to extended-life settable composition as it is being pumped from the vessel 4. Alternatively, a cement set activator may be added to an extended-life cement composition after the extended-life settable composition has been pumped into the wellbore. In embodiments that add the cement set activator to the extended-life settable composition as it is being pumped, a jet mixer may be used, for example, to continuously mix the cement set activator and the extended-life settable composition as it is being pumped to the wellbore. Alternatively, a re-circulating mixer and/or a batch mixer may be used to mix the extended-life settable composition and the cement set activator, and the cement set activator may be added to the mixer as a powder prior to pumping the extended-life settable composition downhole. Additionally, batch mixer type units may be plumbed in line with a separate vessel containing a cement set activator. The cement set activator may then be fed in-line with the extended-life settable composition as it is pumped out of the vessel 4. There is no preferred method for preparing or mixing the extended-life settable compositions, and one having ordinary skill in the art should be readily able to prepare, mix, and pump the extended-life settable compositions using the equipment on hand.

Figure 2:
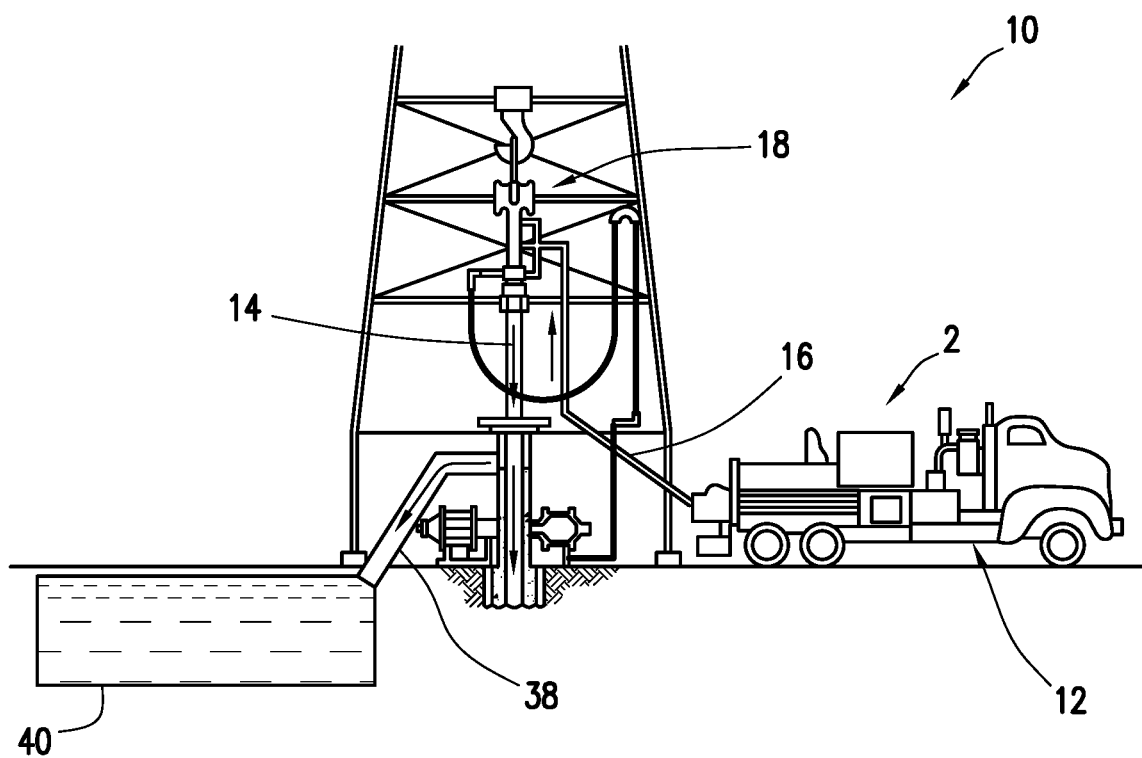
FIG. 2 illustrates surface equipment that may be used in placement of an extended-life settable composition in a wellbore in accordance with certain embodiments.

An example technique for placing an extended-life cement composition into a subterranean formation will now be described with reference to FIG. 2. FIG. 2 illustrates surface equipment 10 that may be used in the placement of an extended-life settable composition in accordance with certain embodiments. It should be noted that while FIG. 2 generally depicts a land-based operation, those skilled in the art will readily recognize that the principles described herein are equally applicable to subsea operations that employ floating or sea-based platforms and rigs, without departing from the scope of the disclosure. As illustrated by FIG. 2, the surface equipment 10 may include a cementing unit 12, which may include one or more cement trucks. The cementing unit 12 may include the vessel 4 and the pumping equipment 6 shown in FIG. 1 which is represented by system 2 on the cementing unit 12, as will be apparent to those of ordinary skill in the art. The cementing unit 12 may pump an extended-life settable composition 14 through a feed pipe 16 and to a cementing head 18 which conveys the extended-life settable composition 14 downhole.

Figure 3:
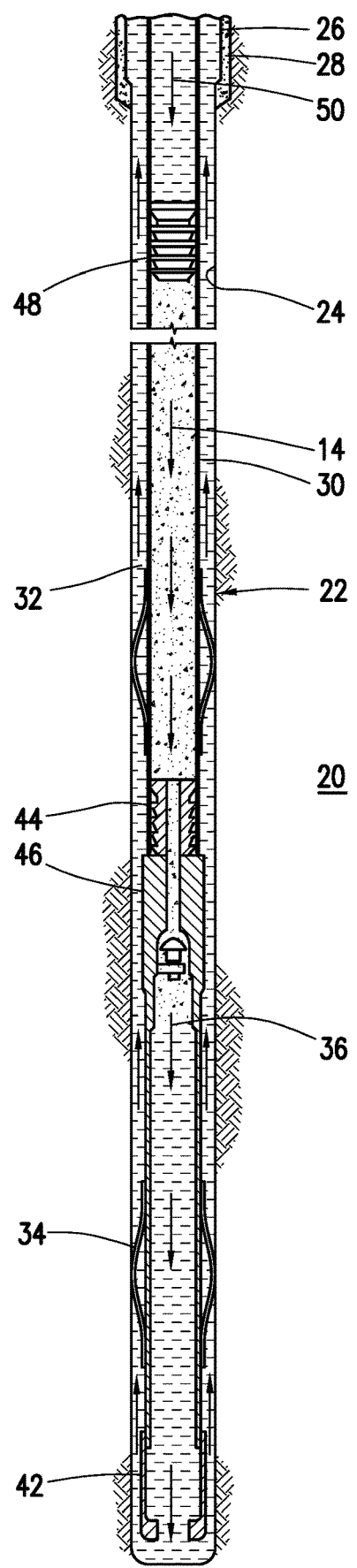
FIG. 3 illustrates placement of an extended-life settable composition into a wellbore annulus in accordance with certain embodiments.

Turning now to FIG. 3, placing the extended-life settable composition 14 into a subterranean formation 20 will now be described. As illustrated, a wellbore 22 may be drilled into the subterranean formation 20. While wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24. In the illustrated embodiment, a surface casing 26 has been inserted into the wellbore 22. The surface casing 26 may be cemented to the walls 24 of the wellbore 22 by cement sheath 28. In the illustrated embodiment, one or more additional conduits (e.g., intermediate casing, production casing, liners, etc.), shown here as casing 30 may also be disposed in the wellbore 22. As illustrated, there is a wellbore annulus 32 formed between the casing 30 and the walls 24 of the wellbore 22 and/or the surface casing 26. One or more centralizers 34 may be attached to the casing 30, for example, to centralize the casing 30 in the wellbore 22 prior to and during the cementing operation.

With continued reference to FIG. 3, the extended-life settable composition 14 may be pumped down the interior of the casing 30. The extended-life settable composition 14 may be allowed to flow down the interior of the casing 30 through the casing shoe 42 at the bottom of the casing 30 and up around the casing 30 into the wellbore annulus 32. The extended-life settable composition 14 may be allowed to set in the wellbore annulus 32, for example, to form an annular sheath that supports and positions the casing 30 in the wellbore 22. While not illustrated, other techniques may also be utilized for introduction of the extended-life settable composition 14. By way of example, reverse circulation techniques may be used that include introducing the extended-life settable composition 14 into the subterranean formation 20 by way of the wellbore annulus 32 instead of through the casing 30.

As it is introduced, the extended-life settable composition 14 may displace other fluids 36, such as drilling fluids and/or spacer fluids that may be present in the interior of the casing 30 and/or the wellbore annulus 32. At least a portion of the displaced fluids 36 may exit the wellbore annulus 32 via a flow line 38 and be deposited, for example, in one or more retention pits 40 (e.g., a mud pit), as shown on FIG. 2. Referring again to FIG. 3, a bottom plug 44 may be introduced into the wellbore 22 ahead of the extended-life settable composition 14, for example, to separate the extended-life settable composition 14 from the fluids 36 that may be inside the casing 30 prior to cementing. After the bottom plug 44 reaches the landing collar 46, a diaphragm or other suitable device should rupture to allow the extended-life settable composition 14 through the bottom plug 44. In FIG. 3, the bottom plug 44 is shown on the landing collar 46. In the illustrated embodiment, a top plug 48 may be introduced into the wellbore 22 behind the extended-life settable composition 14. The top plug 48 may separate the extended-life settable composition 14 from a displacement fluid 50 and also push the extended-life settable composition 14 through the bottom plug 44.

The exemplary extended-life settable compositions disclosed herein may directly or indirectly affect one or more components or pieces of equipment associated with the preparation, delivery, recapture, recycling, reuse, and/or disposal of the disclosed extended-life settable compositions. For example, the disclosed extended-life settable compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary extended-life settable compositions. The disclosed extended-life settable compositions may also directly or indirectly affect any transport or delivery equipment used to convey the extended-life settable compositions to a well site or downhole such as, for example, any transport vessels, conduits, pipelines, trucks, tubulars, and/or pipes used to compositionally move the extended-life settable compositions from one location to another, any pumps, compressors, or motors (e.g., topside or downhole) used to drive the extended-life settable compositions into motion, any valves or related joints used to regulate the pressure or flow rate of the extended-life settable compositions, and any sensors (i.e., pressure and temperature), gauges, and/or combinations thereof, and the like. The disclosed extended-life settable compositions may also directly or indirectly affect the various downhole equipment and tools that may come into contact with the extended-life settable compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

EXAMPLES

To facilitate a better understanding of the present claims, the following examples of certain aspects of the disclosure are given. In no way should the following examples be read to limit, or define, the entire scope of the claims.

Example 1

A sample of red mud was obtained from an alumina manufacturer and subjected to oxide analysis by EDXRF (Energy Dispersive X-Ray Fluorescence) which showed the following composition by weight:

TABLE 1

| Full Oxide Analysis of Red Mud | | |
|---|---|---|
| Oxide | Full Oxide (wt %) | Loss Corrected (wt %) |
| $Na_2O$ | 1.19 | 1.34 |
| MgO | 0.07 | 0.08 |
| $Al_2O_3$ | 17.3 | 19.47 |
| $SiO_2$ | 29.77 | 33.51 |
| $SO_3$ | 0.98 | 1.1 |
| $K_2O$ | 1.18 | 1.33 |
| CaO | 18.27 | 20.57 |
| $P_2O_5$ | 1.29 | 1.45 |
| $TiO_2$ | 3.09 | 3.48 |
| $Mn_2O_3$ | 0.33 | 0.37 |

TABLE 1-continued

Full Oxide Analysis of Red Mud

| Oxide | Full Oxide (wt %) | Loss Corrected (wt %) |
|---|---|---|
| $Fe_2O_3$ | 15.31 | 17.23 |
| ZnO | 0.02 | 0.02 |
| SrO | 0.04 | 0.05 |
| LOI | 11.16 | — |
| Moisture Content | 22.94 | |

The sample of red mud was subjected to X-ray diffraction analysis with Rietveld Full Pattern refinement, which showed the following crystalline materials present by weight:

TABLE 2

XRD of Red Mud

| Mineral | Empirical Formula | Concentration |
|---|---|---|
| Calcite | $CaCO_3$ | 22% |
| Quartz | $SiO_2$ | 30% |
| Hatrurite | $C_3S$ | 2% |
| Larnite | $C_2S$ | 2% |
| Brownmillerite | $C_4AF$ | trace |
| Hematite | $Fe_2O_3$ | 10% |
| Magnetite | $Fe_3O_4$ | 1% |
| Katoite | $Ca_3Al_2(SiO_4)_{3-x}(OH)_{4x}$ x = 1.5-3 | — |
| Hauyne | $Na_3CaAl_3Si_3O_{12}(SO_4)_2$ | 9% |
| Anhydrite | $CaSO_4$ | 1% |
| Gibbsite | $Al(OH)_3$ | 4% |
| K-feldspar | $KAlSI_3O_8$ | 4% |
| Kaolinite | $Al_2Si_2O_5(OH)_4$ | 10% |
| Perovskite | $CaTiO_3$ | 5% |

As discussed above, red mud has no katoite and is mostly comprised of calcite and quartz. These properties distinguish red mud from other waste products obtained from bauxite refining (e.g., brown mud).

Example 2

Figure 4:
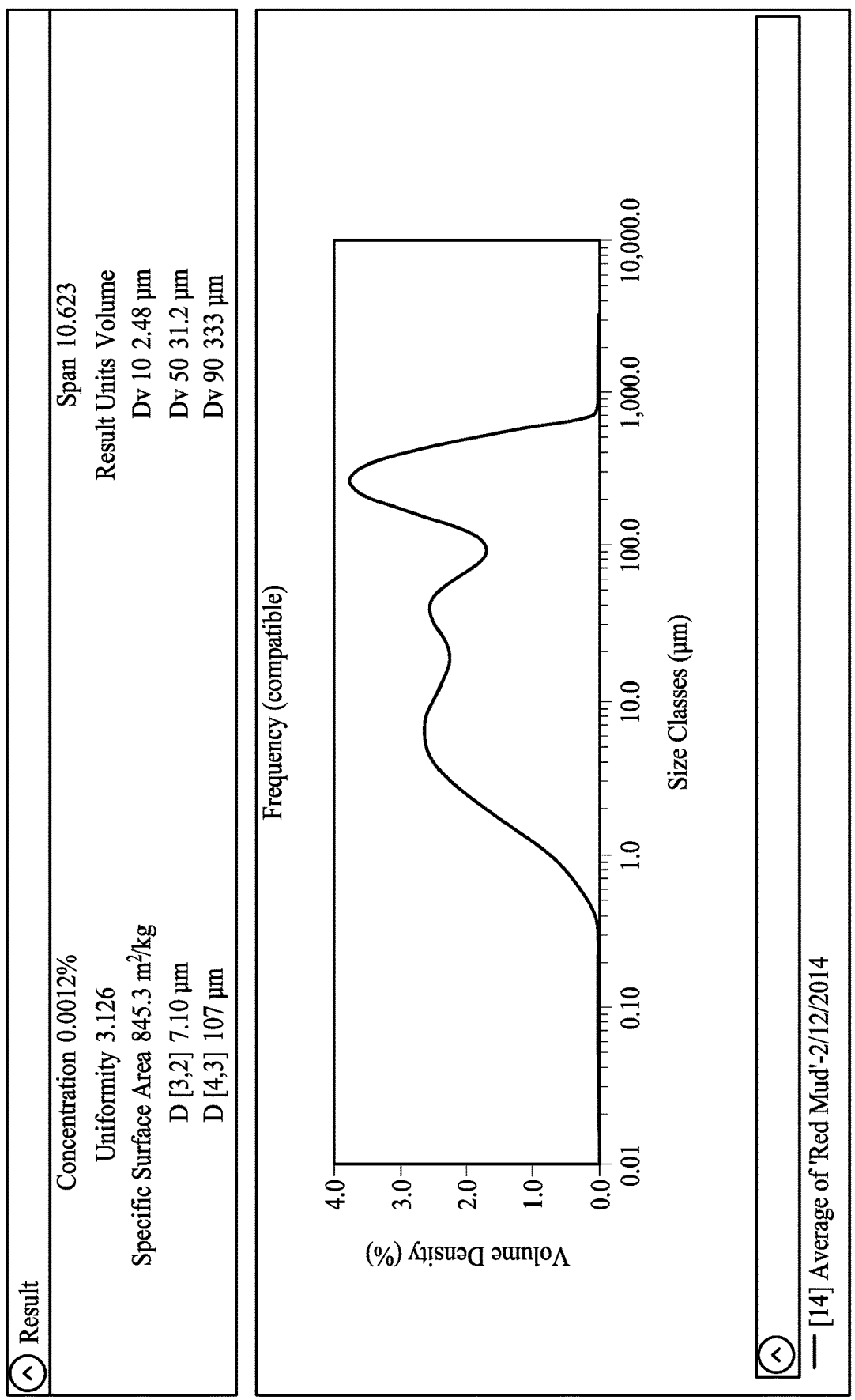
FIG. 4 illustrates the particle size distribution for a sample of red mud.

Particle size analysis was performed on a sample of red mud to obtain the particle size distribution in the sample using a Malvern Mastersizer® 3000 laser diffraction particle size analyzer. The particle size distribution is illustrated in FIG. 4. The particle size analysis illustrates the wide distribution of particle sizes in the red mud sample. The median particle size in the sample was 31.2 µm. 10% of the sample contained material with a particle diameters less than 2.5 µm. 10% of the sample also contained material with particle diameters greater than 333 µm. This wide range of particle sizes may allowsthe red mud to bridge bigger, wider lost circulation zones as well as small lost circulation fractures. The synergistic effect from the different sized particles may provide optimal plugging, bridging, etc. and makes the red mud ideally suited for use as a lost circulation material. Table 3 illustrates the size distributions.

TABLE 3

Particle Size Analysis
Particle Size Distribution of Red Mud Solid Particles

| D10 (microns) | 2.48 |
|---|---|
| D50 (microns) | 31.2 |
| D90 (microns) | 333 |

The density of the sample of the red mud was also determined using a Quantachrome® Ultrapyc 1200. The density was determined before and after drying. The sample was dried in a vacuum oven at 180° F. for 24 hours. The density in grams per cubic centimeter is provided in the table below.

TABLE 4

Density Analysis

| Red Mud | Density (g/cc) |
|---|---|
| As received | 2.04 |
| Dried | 2.86 |

Example 3

A sample extended-life settable composition was prepared to evaluate the use of red mud as a settable material. To prepare the sample extended-life cement composition a sample of red mud was mixed with water, calcium hydroxide, and a dispersant. The sample was split in two to create two experimental samples. The first experimental sample was left neat and no activator/accelerator was added to it. The second experimental sample was provided calcium chloride which is believed to function as an accelerator. The sample slurries were each prepared by dry blending the red mud, calcim hydroxide, and dispersant. The dry blends were then each added to a blender which contained tap water and blended per API specifications. In these examples, the term "% BWoRM" refers to the percent of each component by weight of the red mud. Table 5 illustrates the compositional make-up of the sample slurries.

As discussed above, experimental sample 2 was accelerated by the addition of a solution of 43% calcium chloride in a sufficient amount to reach a calcium chloride content in experimental sample 2 of 10% BWoRM. After addition of the calcium chloride, each of the experimental samples were cured in 1 inch by 2 inch brass cylinders that were placed in water baths at 180° F. for 24 hours at atmospheric pressure. Then, the destructive compress strengths (C.S.) were measured using a mechanical press in accordance with the procedure set forth in API RP Practice 10B-2, *Recommended Practice for Testing Well Cements*. The compressive strength data is presented in Table 5 below. The reported compressive strengths are an average for two cylinders of each sample slurry. The density of each sample was 13.6 pound per gallon (ppg).

TABLE 5

Sample Composition

| | Experimental Sample | |
|---|---|---|
| | 1 | 2 |
| Component | % BWoRM | % BWoRM |
| Red Mud | 100 | 100 |
| Water | 41.3 | 41.3 |
| Calcium Hydroxide | 20.0 | 20.0 |
| Dispersant | 0.38 | 0.38 |
| $CaCl_2$ | — | 10.0 |
| Compressive Strength (psi) | Consolidated, <50 | 234 |

This experiment thus illustrates that red mud can function as an extended-life settable composition. Thus it may be used in application for extended-life settable compositions and as a replacement material for known extended-life settable materials to reduce costs.

Example 4

Additional rheological testing was performed on an extended-life settable composition that was retarded and allowed to age for 17 days. To prepare the sample extended-life cement composition a sample of red mud was mixed with water, calcium hydroxide, a cement retarder, a weight additive, and a dispersant. The cement retarder was MICRO MATRIX® cement retarder available from Halliburton Energy Services, Inc. of Houston, Tex. The weight additive was MICROMAX® weight additive available from Halliburton Energy Services, Inc. of Houston, Tex. The dispersant was LIQUIMENT® 5581 F available from BASF SE of Houston, Tex. The sample was prepared by dry blending the red mud, calcium hydroxide, cement retarder, weight additive, and dispersant. The dry blend was then added to a blender which contained tap water and the phosphonic acid retarder and blended per API specifications. The density of the sample was 13.6 pound per gallon (ppg).

TABLE 6

Sample Composition

| Component | % BWoRM |
|---|---|
| Red Mud | 100 |
| Water | 43.0 |
| Calcium Hydroxide | 20.0 |
| Weight Additive | 2.0 |
| Retarder | 1.5 |
| Dispersant | 0.10 |

After 17 days a 5550 Chandler Viscometer was used to measure the rheology of the sample in accordance with the procedure set forth in API RP Practice 10B-2, *Recommended Practice for Testing Well Cements*. The data is presented in Table 7 below.

TABLE 7

Rheological Profile

| | Viscosity (cP) | |
|---|---|---|
| Slurry | 3 RPM | 6 RPM |
| Day 17 | 15124 | 8744 |

After the rheological profile was obtained, the sample was split into two experimental samples. Experimental sample 1 was used as a control and did not include an activator/accelerator. Experimental sample 2 was activated and accelerated by the addition of a solution of ____ % calcium chloride in a sufficient amount to reach a calcium chloride content in experimental sample 2 of 10% BWoRM. After addition of the calcium chloride, the compressive strengths were determined in accordance with API RP 10B-2, *Recommended Practice for Testing Well Cements*, First Edition, July 2005, using a FANN® ultrasonic cement analyzer at 180° F. while maintained at 3000 psi. The compressive strength data was measured at 1, 3, and 5 days. Note that the sample was aged 17 days prior to curing. The compressive strength data is presented in Table 8 below. The reported compressive strengths are an average for two cylinders of each sample slurry.

TABLE 8

Compressive Strengths

| Experimental Sample | Activator/Accelerator | Day 1 C.S. (psi) | Day 3 C.S. (psi) | Day 5 C.S. (psi) |
|---|---|---|---|---|
| 1 | — | 22 | 32 | 20 |
| 2 | 10% BWoRM CaCl$_2$ | 222 | 240 | 245 |

Example 4 illustrates that the slurry without the activator/accelerator showed no compressive strength development after 5 days, whereas the sample comprising the activator/accelerator was able to gains strength over time.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, and may be modified and practiced in different but equivalent manners apparent to those skilled in the art having the benefit of the teachings herein. Although individual embodiments are discussed, the disclosure covers all combinations of all of the embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of those embodiments. If there is any conflict in the usages of a word or term in this specification and one or more patent(s) or other documents that may be incorporated herein by reference, the definitions that are consistent with this specification should be adopted.

What is claimed is:

1. An extended-life settable composition comprising:
red mud;
calcium hydroxide;

water; and a cement set retarder, wherein the red mud is present in a red mud-to-calcium hydroxide weight ratio of about 3:1 to about 5:1, wherein the red mud is a product of refining bauxite ore, the refining comprising sodium hydroxide digestion of the bauxite ore followed by filtration of solid impurities generated by the digestion, and wherein the extended-life settable composition is capable of remaining in a pumpable fluid state for 1 day or longer at 80° F.

2. A composition according to claim 1, wherein the red mud is an insoluble residue from extraction of alumina from bauxite ore.

3. A composition according to claim 1, wherein the water is present in the extend-life settable composition in an amount of at least 40% by weight of the red mud.

4. A composition according to claim 1, wherein the red mud comprises at least 20% calcite.

5. A composition according to claim 1, wherein the cement set retarder comprises a phosphonic acid derivative, and wherein the extended-life settable composition further comprises a polycarboxylated ether dispersant.

6. A system comprising:

an extended-life settable composition that is capable of remaining in a pumpable fluid state for 1 day or longer at 80° F.; wherein the extended-life settable composition comprises red mud, calcium hydroxide, water, and a cement set retarder, wherein the red mud is present in a red mud-to-calcium hydroxide weight ratio of about 3:1 to about 5:1, and wherein the red mud is a product of refining bauxite ore, the refining comprising sodium hydroxide digestion of the bauxite ore followed by filtration of solid impurities generated by the digestion; and a cement set activator for at least one of activating and accelerating the extended-life settable composition.

7. A system according to claim 6, further comprising a vessel containing the extended-life settable composition and a pump coupled to the vessel for delivering the extended-life settable composition into a wellbore.

8. A system according to claim 6, wherein the cement set retarder is selected from the group consisting of a phosphonic acid, a phosphonic acid derivative, a lignosulfonate, a salt, an organic acid, a cellulose derivative, a synthetic co- or ter-polymer comprising sulfonate and carboxylic acid groups, a borate compound, and any combination thereof.

9. A system according to claim 6, wherein the cement set retarder comprises a phosphonic acid derivative, and wherein the extended-life settable composition further comprises a polycarboxylated ether dispersant.

* * * * *